(No Model.)

B. W. TUCKER & W. S. CORWIN.
ELEVATOR.

No. 601,490. Patented Mar. 29, 1898.

WITNESSES:
Joseph Keeler
Eugenie A. Persides

INVENTORS:
Benjamin W. Tucker
William S. Corwin
BY
ATTORNEY.

UNITED STATES PATENT OFFICE.

BENJAMIN W. TUCKER AND WILLIAM S. CORWIN, OF NEWARK, NEW JERSEY.

ELEVATOR.

SPECIFICATION forming part of Letters Patent No. 601,490, dated March 29, 1898.

Application filed October 12, 1897. Serial No. 654,933. (No model.)

*To all whom it may concern:*

Be it known that we, BENJAMIN W. TUCKER and WILLIAM S. CORWIN, citizens of the United States of America, and residents of Newark, in the county of Essex and State of New Jersey, have invented certain new and useful Improvements in Elevators, of which the following is a specification.

Our invention relates to that class of elevators in which buckets attached to an endless chain or chains are relieved of their contents at a predetermined fixed level.

The object of our invention is to provide means whereby the buckets may be made to dump their contents automatically at any desired point in the course of the carrying chain or chains, so as to avoid breakage and waste of power by carrying the material to an unnecessary height.

With this object in view our invention consists, essentially, in a hopper or chute adjustably mounted, means in connection with said hopper or chute for effecting the adjustment of the same to different levels, combined with buckets, actuating means for said buckets, and means for causing their discharge into the said hopper or chute at different levels.

Our invention also consists in certain special features, as more particularly hereinafter described.

Figure 1:
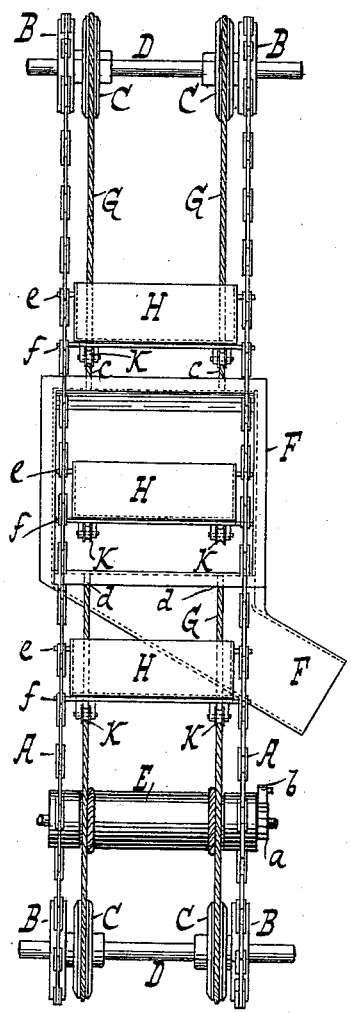
Figure 2:
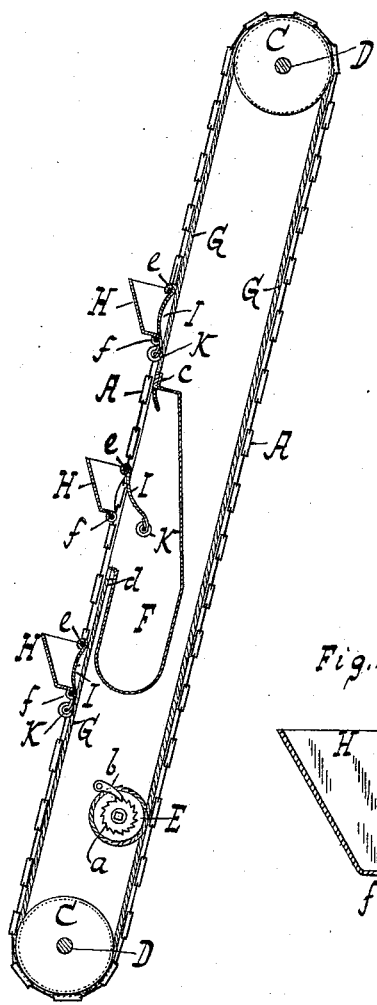
Figure 4:
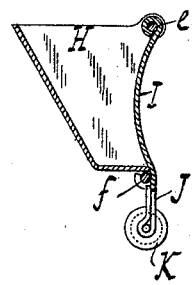
Figure 3:
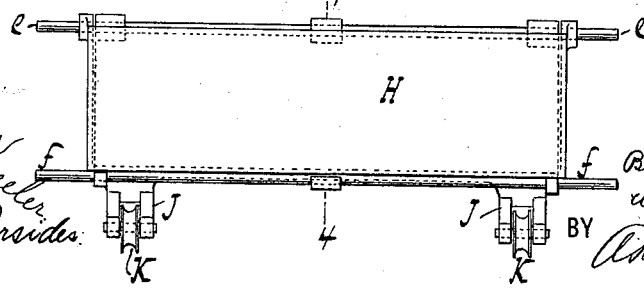

The nature of our invention will best be understood when described in connection with the accompanying drawings, in which—
Figure 1 illustrates a front elevation of our improved elevator, the framing being omitted. Fig. 2 is a vertical section of the same. Fig. 3 is a front elevation, on an enlarged scale, of one of the buckets. Fig. 4 is a transverse section of the same on the line 4 4, Fig. 3.

Similar letters of reference designate corresponding parts throughout the several views of the drawings.
Referring to the drawings, the letters A A designate the two sprocket-chains of the elevator, extending over the sprocket-wheels B B B.

C C C C are pulleys on the same shafts D as the wheels B, but having their movements independent of those of said wheels. Parallel with the shafts D and situated between the upper and lower sets of wheels B and pulleys C is a drum E, provided at one end with a ratchet-wheel $a$ and a holding-pawl $b$, engaging with said ratchet-wheel.

F is a hopper or chute inclosed between the two parallel sides of the chain A and opening outwardly.

G G are two cables, each of which is secured by its two ends, respectively, to the outer frame of the hopper or chute F, above and below its opening, as shown at $c\ d\ c\ d$. The cables G also extend around the upper and lower pulleys C C and are wound around the drum E one or more turns, as desired, to obtain the necessary friction for moving the cables.

H H H are the buckets, which are connected to the chains A in the usual manner by the upper and lower cross-bars $e$ and $f$. The door I of each bucket H is pivoted to the upper bar $e$ and is provided with downwardly-projecting hangers J, extending below the bucket and in which rollers K are journaled. The rollers K rest upon the cables G and are adapted to ride upon the same. They may be grooved or flat-faced, as desired.

By the movement of the chains A the buckets H will ride with their rollers K on the cables G, said bearing holding the doors against the buckets and keeping them shut until said rollers K leave the cables G at the lower end of the opening of the hopper or chute F, whereupon said doors will swing open and allow the contents of the buckets to be dumped into the hopper or chute. As soon, however, as the rollers K have reached the cables G again at the upper end of the hopper or chute opening said rollers will reëngage with the cables G and the doors I will be closed. (See Fig. 2.) By rotating the drum E the cables G will be moved so that the hopper or chute F can be adjusted to any height desired, the ratchet-wheel $a$ and pawl $b$ retaining said cables and hopper or chute in such position, and therefore the hopper or chute can be raised as the height of the pile increases, thus avoiding an unnecessary height of fall, and thereby reducing waste by breakage.

While we have herein shown and described the hopper or chute adjustable by means of cables attached to a drum, it is of course to be understood that any mechanical equivalent can be substituted therefor—such, for instance, as a screw engaging with the hopper or chute and with a nut, or a rack-and-pinion movement may be used. While the discharge of the buckets is shown to be automatically effected by reason of the rollers leaving the cables at the hopper or chute opening, such discharge could be effected by any usual form of trip moving with the hopper or chute. It is also evident that one cable G would be sufficient to raise and lower the frame; but we prefer to use two for the sake of steadiness.

What we claim as new is—

1. In an elevator, a hopper or chute adjustably mounted, means in connection with said hopper or chute for effecting the adjustment of the same to different levels, combined with buckets, actuating means for said buckets, and means for causing their discharge into the said hopper or chute at different levels, substantially as described.

2. In an elevator, the combination of a bearing or track provided with a break or opening therein, means for moving said bearing or track for adjusting the level of the break or opening, and buckets provided with rearwardly-opening doors adapted to engage with said bearing or track and to open when the break or opening in the bearing or track is reached to effect the discharge of the contents of the bucket through the break or opening, substantially as described.

3. In an endless-chain elevator, the combination with the buckets and their carrying-chains, of a bearing or track for the movable doors of the buckets extending in the same direction as the chains, an open frame attached to said bearing or track, and means for moving said bearing or track to adjust or set the open frame at different levels, substantially as described.

4. In an endless-chain elevator, the combination with the buckets and their carrying-chains, of a cable extending in the same direction as the chains and forming a bearing or track for the movable doors of the buckets, pulleys about which said cable passes, an open frame attached to the ends of said cable, and means for moving said cable about its pulleys for adjusting the open frame to different levels, substantially as described.

5. In a chain elevator, the combination with the buckets and their carrying-chains, of a cable extending in the same direction as the chains and forming a bearing or track for the movable doors of the buckets, pulleys about which said cable passes, a hopper or chute connected with the two ends of the cable, a rotatable drum around which said cable is wound for effecting the adjustment of the hopper or chute to different levels, and means for locking the hopper or chute in its adjusted position, substantially as described.

6. The combination with an endless chain, of a bucket having a rear opening and connected to said chain at its top and bottom, a swinging door for said opening hinged or pivoted at or near its upper end and having a downwardly-projecting extension, a movable bearing or track extending in the same direction as the chain and engaged by said extension; said bearing or track being provided with a break or opening, and means for moving the bearing or track for the purpose of adjusting the level of the break or opening, substantially as described.

7. The combination with an endless chain, of a bucket having a rear opening and connected to said chain at the top and bottom of said rear opening and provided with a swinging door for said opening; said door being hinged or pivoted at or near its upper end, a roller mounted at or near the lower end of said door, a cable extending in the same direction as the chain and forming a bearing or track for the roller on the bucket-door, an open frame having its two opposite sides connected respectively with the two ends of the cable, and means for moving said cable for adjusting the frame, substantially as described.

In testimony that we claim the foregoing as our invention we have signed our names, in presence of two witnesses, this 8th day of October, 1897.

BENJAMIN W. TUCKER.
WILLIAM S. CORWIN.

Witnesses:
A. FABER DU FAUR, Jr.,
EUGENIE A. PERSIDES.